US006833687B2

(12) United States Patent
Landolt

(10) Patent No.: US 6,833,687 B2
(45) Date of Patent: Dec. 21, 2004

(54) ELECTROMECHANICAL POWER CONVERTER

(75) Inventor: Oliver D. Landolt, Mountain View, CA (US)

(73) Assignee: Agilent Technologies, Inc., Palp Alto, CA (US)

( * ) Notice: Subject to any disclaimer, the term of this patent is extended or adjusted under 35 U.S.C. 154(b) by 25 days.

(21) Appl. No.: 10/418,806

(22) Filed: Apr. 18, 2003

(65) Prior Publication Data

US 2004/0207369 A1 Oct. 21, 2004

(51) Int. Cl.⁷ .............................................. H01M 10/46
(52) U.S. Cl. ...................................................... 320/166
(58) Field of Search ................................ 320/160, 166, 320/167; 307/400

(56) References Cited

U.S. PATENT DOCUMENTS

| | | | | |
|---|---|---|---|---|
| 3,652,932 A | * | 3/1972 | Sessler et al. | 324/72 |
| 3,705,312 A | * | 12/1972 | Sessler et al. | 307/400 |
| 4,041,446 A | * | 8/1977 | Liebermann | 367/181 |
| 4,887,248 A | | 12/1989 | Griebeler | |
| 5,590,014 A | * | 12/1996 | Bushman | 361/225 |
| 5,889,389 A | * | 3/1999 | Bothra et al. | 320/166 |
| 6,067,084 A | | 5/2000 | Fado et al. | |

FOREIGN PATENT DOCUMENTS

WO   WO 98/08239   2/1998

OTHER PUBLICATIONS

R. Gerhard–Multhaupt, X. Zhengfu; W. Kunstler; A. Pucher, "Preliminary study of multi–layer space–charge electrets with piezoelectric properties from porous and non–porous Teflon films", Proceedings 10th International Symposium on Electrets, ISE 10, 1999, pp. 273–276.
R. Amirtharajah, A.P. Chandrakasan, "Self–Powered Signal Processing Using Vibration–Based Power Generation", IEEE Journal of Solid–State Circuits, vol. 33, No. 5, May 1998, pp. 687–695.

W. Benecke, "Silicon–Microactuators: Activation Mechanisms and Scaling Problems", International Conference on Solid–State Sensors and Actuators (Transducers'91), Jun. 1991, pp. 46–50.
S. Meninger, J.O. Mur–Miranda, R. Amirtharajah, A.P. Chandrakasan, J.H. Lang, "Vibration–to–Electric Energy Conversion", IEEE Transactions on VLSI Systems, vol. 9, No. 1, Feb. 2001, pp. 64–76.
S. Roundy, P. Wright, "Energy Scavenging for the PicoRadio Project", http://madmax.me.berkeley.edu/ shadr/overview.html (Sep. 2001).
N.S. Schenk, J.A. Paradiso, "Energy scavenging with shoe–mounted piezoelectrics", IEEE Micro, vol. 21, No. 3, May–Jun. 2001, pp. 30–42.
W.H. Hsieh, T.J. Yao, Y.C. Tai, "A High Performance MEMS Thin–film Teflon Electret Microphone," 1999 International Conference on Solid–State Sensors and Actuators (Transducers '99), Sendai, Japan, Jun. 1999, pp. 425–428.
Yu–Chong Tai, "A High Performance MEMS Thin–Film Teflon Electret Microphone," California Institute of Technology (1999).
W.H. Hsieh et al., "A Micromachined Thin–Film Teflon Electret Microphone,"California Institute of Technology (1997).

* cited by examiner

*Primary Examiner*—Edward H. Tso

(57) ABSTRACT

Electromechanical power converters for delivering electric power to a primary load are described. In one aspect, an electromechanical power converter includes first and second electrodes, an electret, and a power extraction circuit. The first and second electrodes form a variable capacitor with a capacitance that varies over an operative capacitance range as a result of relative electrode movement in response to mechanical energy. The electret is disposed between the first and second electrodes. The power extraction circuit is coupled between the first and second electrodes and is operable to conduct charge between the electrodes through the primary load during a discharge phase and to set the electrodes to an inter-electrode reset voltage during a reset phase.

25 Claims, 5 Drawing Sheets

ELECTROMECHANICAL POWER CONVERTER

BACKGROUND

Many electronic systems require or benefit from power autonomy (i.e., the capability of operating from sources of power readily available in their environment instead of being connected to a power grid or batteries with a finite lifetime). This property is particularly desirable for portable electronic devices and electronic devices operating in remote locations (e.g., wilderness, deep sea, outer space) or otherwise inaccessible locations (e.g., inside a human body). Such electronic devices need some way to convert energy from its original form (e.g. optical, mechanical, thermal) into electrical energy.

The most common and mature technology enabling moderately-sized electronic devices to achieve power autonomy is photovoltaic conversion using, for example, solar cells. Although this technology works very well where sufficient light is available, it is not applicable in dimly-lit places or in locations that are inherently shielded from light, such as medical implants, inside building structures, deep sea, and underground. An alternative power conversion technology involves extracting energy from mechanical sources.

Electromechanical conversion currently is used to produce most of the power that is distributed on the regular power grid. Miniature electromechanical converters, on the other hand, have been developed to take advantage of a variety of mechanical power sources, such as ambient vibrations, human walking motion, wind, and water flow.

SUMMARY

The invention features electromagnetic power converters that are operable to convert mechanical power into electrical power based on the variations in capacitance between electrodes that are moved relative to each other in response to mechanical energy.

In one aspect, the invention features an electromechanical power converter for delivering electric power to a primary load. The electromechanical power converter includes first and second electrodes, an electret, and a power extraction circuit. The first and second electrodes form a variable capacitor with a capacitance that varies over an operative capacitance range as a result of relative electrode movement in response to mechanical energy. The electret is disposed between the first and second electrodes. The power extraction circuit is coupled between the first and second electrodes and is operable to conduct charge between the electrodes through the primary load during a discharge phase and to set the electrodes to an inter-electrode reset voltage during a reset phase.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
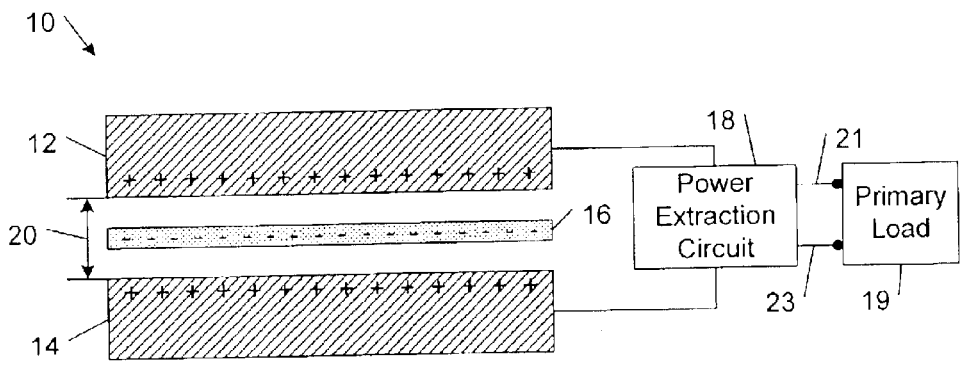
FIG. 1 is a block diagram of an electromechanical power converter that includes a pair of electrodes, an electret, and a power extraction circuit.

FIG. 1 shows an embodiment of an electromechanical power converter 10 that includes a first electrode 12, a second electrode 14, an electret 16, and a power extraction circuit 18.

The first and second electrodes 12, 14 are movable with respect to each other so as to form a variable capacitor with an inter-electrode capacitance that varies over an operative capacitance range in response to mechanical energy. In the illustrated embodiment, the inter-electrode capacitance is varied by changing an inter-electrode spacing 20 that varies over an operative spacing range. The operative spacing range typically depends on the actual implementation of electromechanical power converter 10. In some embodiments, the operative spacing range may extend from the thickness of the electret 16 at a near end of the operative spacing range to a distance that is at least sufficient to generate a target voltage difference between first and second electrodes 12, 14 at a far end of the operative spacing range. In response to mechanical energy, one or both of electrodes 12, 14 move cyclically with respect to each other. In the illustrated embodiments, the direction of motion is perpendicular to the facing electrode surfaces. In other embodiments, the electrodes may move cyclically in any direction that causes a net change of the capacitance between the electrodes.

Electret 16 may be formed of any known electret material, including any inorganic dielectric material (e.g., porous silicon dioxide), organic dielectric material, and metallo-organic dielectric material in which a permanent state of electric polarization may be established. In some embodiments, electret 16 is formed from one or more of the following thermoplastic polymer resins: polyethylene, polyethylene terephthalate (PET), polypropylene, and polytetrafluoroethylene (TEFLON®). In some embodiments, at least one of the electrodes 12, 14 is coated with a layer of electret material, which may be in the form of a thin film.

Electromechanical power converter 10 converts mechanical energy into electrical energy. The electrical energy is transferred to a primary load 19 that is connected to terminals 21, 23 of power extraction circuit 18. In operation, electromechanical power converter 10 cycles through a sequence of four phases: a reset phase; an expansion phase; a discharge phase; and a contraction phase. In the following description, it is assumed that the voltage difference generated during the discharge phase from terminal 21 to terminal 23 is positive. This description readily may be extended to implementations in which the voltage difference generated during the discharge phase from terminal 21 to terminal 23 is negative.

During the reset phase, the power extraction circuit 18 connects electrode 12 to electrode 14. In some embodiments, the connection consists of a short-circuit, but it is also possible to connect electrodes 12 and 14 through a secondary load 35 (see, e.g., FIG. 3D). As a result of this connection, current flows between electrodes 12 and 14 until an equilibrium point is reached. At the point of equilibrium, the total charge on electrodes 12 and 14 is equal in magnitude and opposite in sign to the total charge trapped in the electret. The relative amount of charge on electrodes 12 and 14 depends on their relative distance to the electret. For example, if electrodes 12 and 14 are placed symmetrically with respect to the electret, the amount of charge they carry at equilibrium is equal. The reset phase should preferably occur when the capacitance between electrodes 12 and 14 is at the high end of the operative capacitance range. The electrodes 12 and 14 may or may not move relative to each other during the reset phase. The power extraction circuit 18 disconnects the primary load 19 from electrodes 12 and 14 during the reset phase.

After the reset phase, the expansion phase begins when the power extraction circuit 18 electrically-disconnects the electrodes 12, 14 from each other. The power extraction circuit 18 also continues to electrically-disconnect the primary load 19 from electromechanical power converter 10. The electric charge induced in the electrodes 12, 14 therefore remains substantially constant during the expansion phase. Mechanical energy applied to electromechanical power converter 10 moves the electrodes 12, 14 relative to each other (e.g., by increasing the separation distance between the electrodes or by reducing the area of overlap between the electrodes) so as to reduce the capacitance and, therefore, increase the voltage between the electrodes 12, 14. This allows electric power to be built-up and stored in the form of an electric potential across electrodes 12, 14.

After the expansion phase, the discharge phase begins when the power extraction circuit 18 connects the primary load 19 to the electrodes 12 and 14. As a result of this connection, current flows between electrodes 12 and 14 through the primary load 19 until a new equilibrium point is reached. The amount of charge stored on electrodes 12 and 14 during the reset phase no longer corresponds to equilibrium because the relative distances of electrodes 12 and 14 to the electret have changed during the expansion phase. For example, if electrode 12 is now at a much larger distance from the electret than electrode 14, equilibrium is reached when nearly all charge is carried by electrode 14, whereas almost no charge is carried by electrode 12. The flow of current results in the transfer of electrical energy to the primary load 19. The discharge phase should preferably occur when the capacitance between electrodes 12 and 14 is at the low end of the operative capacitance range. The electrodes 12 and 14 may or may not move relative to each other during the discharge phase. The secondary load 35, which can optionally be used in the reset phase, remains disconnected from electrodes 12 and 14 during the discharge phase.

After the discharge phase, the contraction phase begins when the power extraction circuit 18 electrically disconnects the primary load 19 from electromechanical power converter 10. The residual electric charge in the electrodes remaining after the discharge phase is substantially constant during the contraction phase. Mechanical energy applied to electromechanical power converter 10 moves the electrodes 12, 14 relative to each other (e.g., by decreasing the separation distance between the electrodes or by increasing the area of overlap between the electrodes) so as to increase the capacitance and, therefore, reduce the voltage, between the electrodes 12, 14. The reset phase of the next cycle begins when the power extraction circuit 18 connects electrodes 12 and 14 together as described above.

Figure 2:
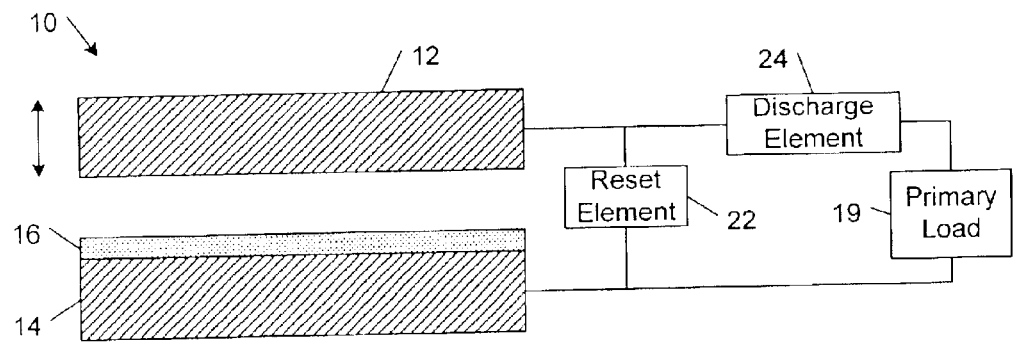
FIG. 2 is a block diagram of an implementation of the electromechanical power converter of FIG. 1 in which the power extraction circuit includes a reset element and a discharge element.

FIG. 2 shows one implementation of the electromechanical power converter of FIG. 1 in which electrode 14 is coated with a layer of electret material 16 and power extraction circuit 18 includes a reset element 22 and a discharge element 24. The reset element 22 electrically connects electrodes 12, 14 to each other during the reset phase and electrically disconnects electrodes 12, 14 from each other during the other phases. The discharge element 24 electrically connects primary load 19 across terminals 21, 23 of power extraction circuit 18 during the discharge phase and electrically disconnects primary load 19 from electromechanical power converter 10 during the other phases. In order for net power to be transferred from electromechanical power converter 10 to primary load 19, the voltage across terminals 12 and 14 at the end of the expansion phase should be greater than the corresponding voltage at the beginning of the expansion phase and should be greater than the primary load voltage (if any).

Figure 3A:
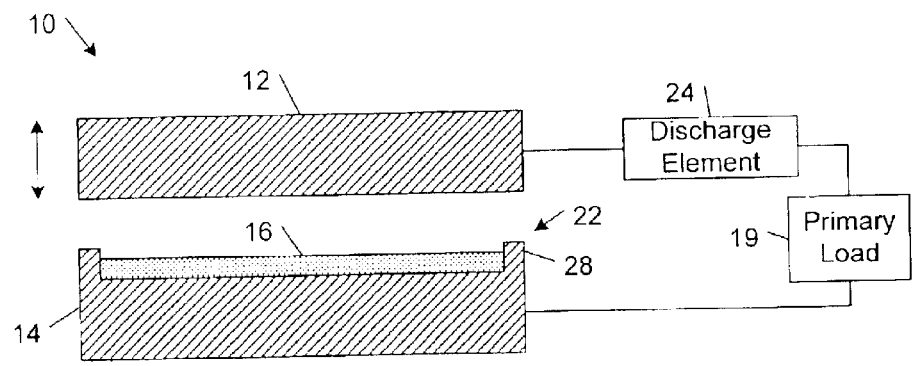
FIG. 3A is a block diagram of an implementation of the electromechanical power converter of FIG. 2 in which the reset element is a mechanical switch that includes an electrically-conducting protrusion from a surface of one of the electrodes.

Referring to FIG. 3A, in one implementation of the embodiment of FIG. 2, reset element 22 includes an electrically-conducting protrusion 28 that extends from the surface of electrode 14. Protrusion 28 is constructed and arranged to contact electrode 12 during the reset phase of operation. When electrode 12 contacts the protrusion 28, the two electrodes 12, 14 are electrically shorted together, reducing the voltage between the electrodes 12, 14 to effectively zero. In this implementation, the two electrodes contact each other during each electrode movement cycle. In some implementations, protrusion 28 extends from the surface of electrode 12 for electrical contact with electrode 14 during the reset phase of operation. In other implementations, electrical contact protrusions may extend from surfaces of both electrodes 12, 14.

Figure 3B:
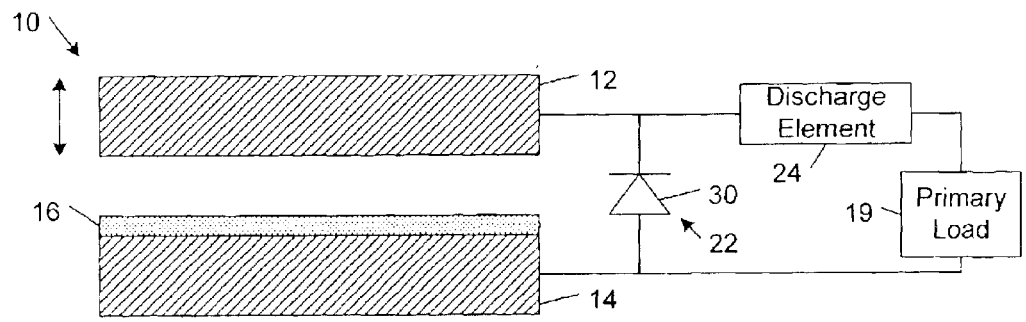
FIG. 3B is a block diagram of an implementation of the electromechanical power converter of FIG. 2 in which the reset element is a rectifier electrically connected between the pair of electrodes.

Referring to FIG. 3B, in another implementation of the embodiment of FIG. 2, reset element 22 is implemented by a rectifier 30 (e.g., a semiconductor junction diode or a Schottky diode). In this implementation, electrodes 12, 14 do not have to come into direct contact.

Figure 3C:
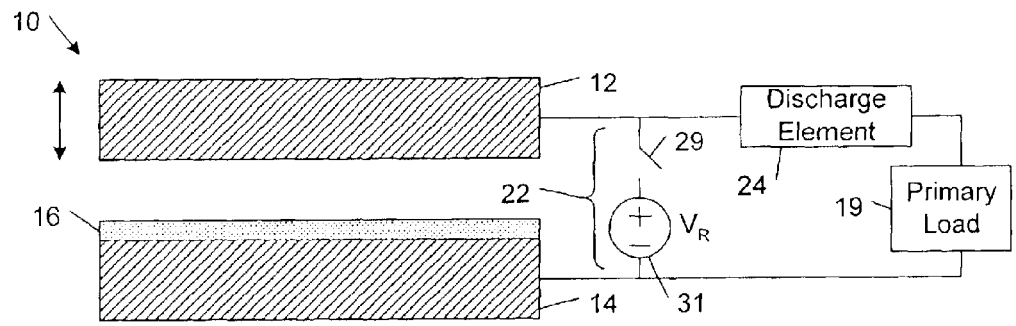
FIG. 3C is a block diagram of an implementation of the electromechanical power converter of FIG. 2 in which the reset element includes a serial arrangement of a voltage source and a switch connected between the pair of electrodes.

Referring to FIG. 3C, in another implementation of the embodiment of FIG. 2, reset element 22 is implemented by a serial arrangement of a switch 29 and a voltage source 31 connected between electrodes 12 and 14. In operation, switch 29 is in a closed state during the reset phase and switch 29 is in an open state during the other phases. When switch 29 is closed, voltage source 31 sets the inter-electrode voltage to the reset voltage $V_R$. Voltage source 31 enhances the action of the electret by causing additional charge to be stored in the variable capacitor formed by electrodes 12 and 14. In this way, the voltage reached at the end of the expansion phase is higher than the voltage reached with a reset voltage of zero. When voltage source 31 is used during the reset phase, power delivered to the primary load 19 originates partly from mechanical power and partly from the voltage source 31. The polarity of the reset voltage $V_R$ should be the same as the polarity of the voltage between electrodes 12 and 14 at the end of the expansion phase to avoid having the reset voltage $V_R$ cancel the action of the electret rather than enhance it.

Figure 3D:
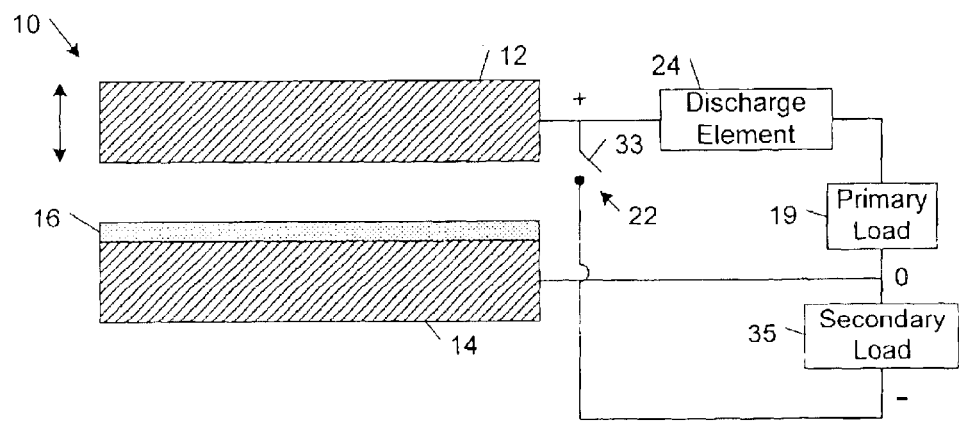
FIG. 3D a block diagram of an implementation of the electromechanical power converter of FIG. 2 in which the reset element includes an electronic switch that is operable to selectively connect the electrodes to a secondary load.

Referring to FIG. 3D, in another implementation of the embodiment of FIG. 2, reset element 22 is implemented by a switch 33 that is operable to selectively connect the electrodes 12, 14 to a secondary load 35. The secondary load 35 may be, for example, a circuit, a voltage source, or a passive load (e.g., a resistor). Switch 33 is in an open state during the expansion and contraction phases of operation. Switch 33 also is in an open state during the discharge phase of operation when charge flows between electrodes 12, 14 through the primary load 19. Switch 33 is in a closed state during the reset phase when charge flows between electrodes 12, 14 through the secondary load. The polarity of the voltage between electrodes 12 and 14 changes between the discharge phase and the reset phase. The magnitude of the voltage across the secondary load 35 does not exceed the built-in voltage $V_0$ (defined in the attached Appendix), which is proportional to the amount of charge stored in electret 16.

Figure 4A:
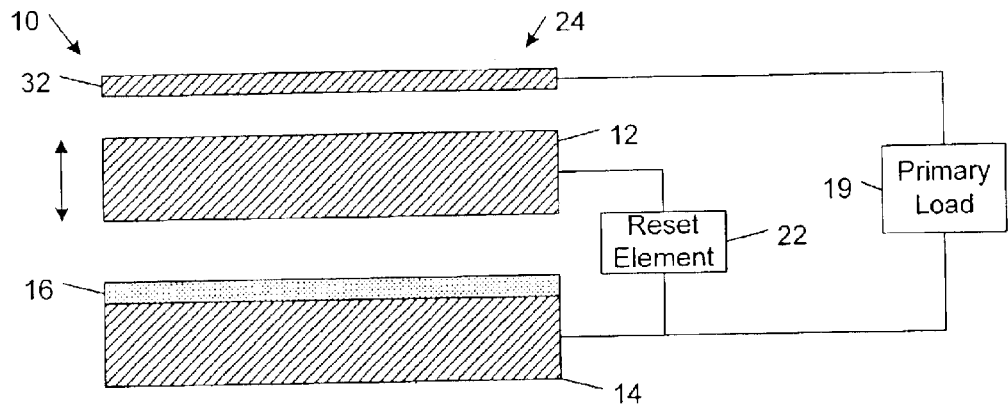
FIG. 4A is a block diagram of an implementation of the electromechanical power converter of FIG. 2 in which the discharge element is a mechanical switch that includes an electrically-conducting bumper.
Figure 4B:
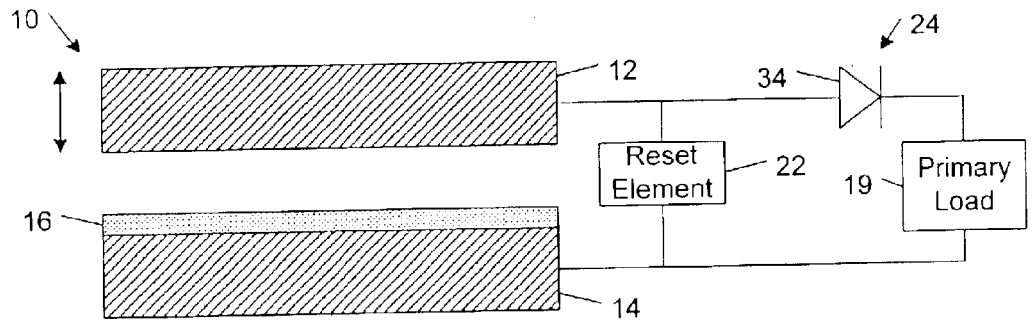
FIG. 4B is a block diagram of an implementation of the electromechanical power converter of FIG. 2 in which the discharge element includes a rectifier.

FIGS. 4A and 4B show implementations of the embodiment of FIG. 2 in which discharge element 24 is a mechanical switch that is implemented as an electrically-conductive bumper 32 that defines the maximum spacing between the electrodes (FIG. 4A) or is a rectifier 34 (FIG. 4B). As explained above, in the illustrated embodiments, it is assumed that the electret 16 has a charge polarity that causes electrode 12 to be charged positively with respect to electrode 14. If the electret 16 were oppositely charged, the orientation of rectifier 34 would be reversed.

In some embodiments, one or both of the mechanical switching arrangements 28, 32 (FIGS. 3A and 4A) may be replaced by a transistor-based electronic switch and a switch controller that is operable to determine when the inter-electrode spacing is appropriate for electrode resetting or discharging. For example, in some implementations, a transistor discharge element is connected in series with electrodes 12, 14 and primary load 19, and the switch controller may be configured to turn on the transistor when the voltage between electrodes 12, 14 exceeds a threshold voltage level (e.g., the threshold voltage of the primary load 19, if any). In some implementations, a transistor discharge element is connected in series with electrodes 12, 14, and the primary load 19, and the switch controller is implemented as a spacing sensor (e.g., an optical or mechanical sensor) that is configured to turn on the transistor when the spacing between electrodes 12, 14 exceeds a threshold distance. In some implementations, a transistor reset element is connected between electrodes 12, 14, and the switch controller is implemented as a spacing sensor (e.g., an optical or mechanical sensor) that is configured to turn on the transistor when the spacing between electrodes 12, 14 is less than a threshold distance. Still other implementations are possible.

Figure 5:
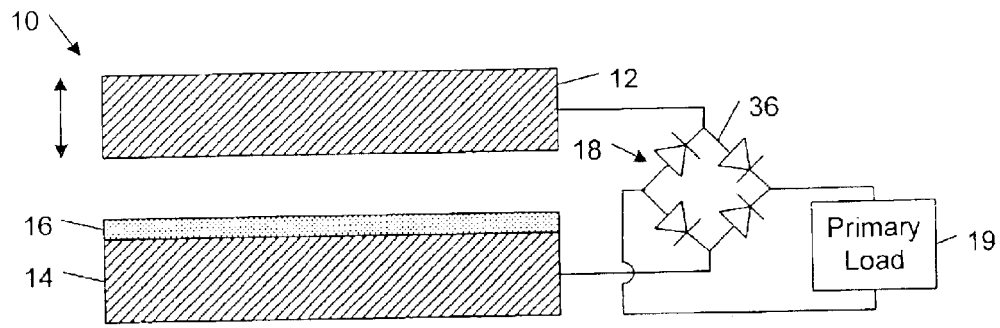
FIG. 5 is a block diagram of an implementation of the electromechanical power converter of FIG. 1 in which the power extraction circuit is implemented by a full-wave rectifier.

FIG. 5 shows an embodiment in which power extraction circuit 18 is implemented by a full-wave rectifier 36. In operation, full-wave rectifier 36 resets the electrodes 12, 14 by transferring the residual charge through the load. Thus, during the reset phase, full-wave rectifier 36 transfers to the primary load 19 energy that otherwise might be dissipated in the reset elements of the above-described embodiments. In the illustrated embodiment, full-wave rectifier 36 is implemented by a bridge circuit of four rectifiers (e.g., diodes). In some embodiments, one or more of the diodes shown in FIG. 5 may be replaced by respective switches (e.g., mechanical switches, transistors, or thyristors).

Figure 6A:
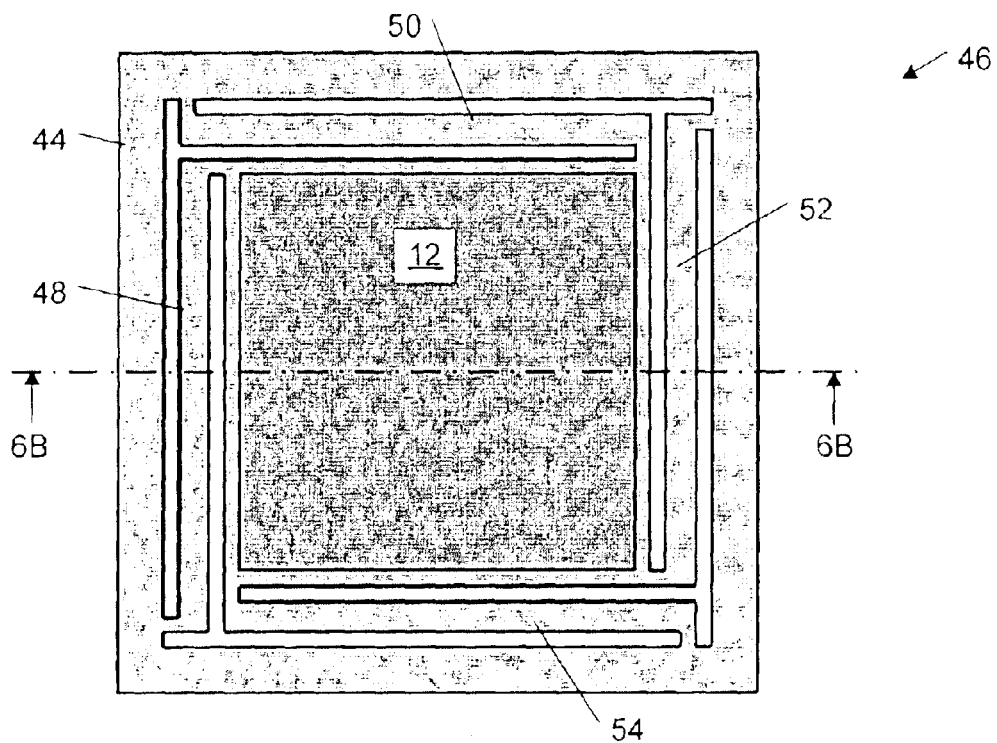
FIG. 6A is a diagrammatic top view of an electromechanical power converter that includes an electrically-conducting plate that is slotted to form multiple spring bars resiliently coupling an electrode portion to a peripheral frame portion.
Figure 6B:
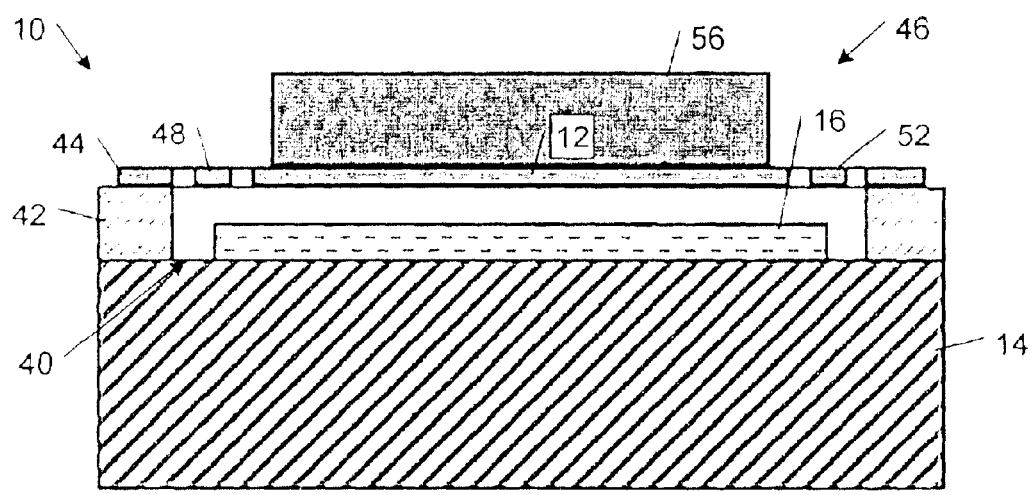
FIG. 6B is a diagrammatic cross-sectional view of the electromechanical power converter of FIG. 6A taken along the line 6B—6B.

FIGS. 6A and 6B shows an embodiment of electromagnetic power converter 10 in which bottom electrode 14 is made of an electrically-conductive flat substrate (e.g. metal or doped silicon). A thin layer of electret material is deposited over most of the substrate area, except in a peripheral region 40. An electrically-insulating spacer layer 42, which may be formed of, for example, photoresist, is patterned to cover at least part of the peripheral region 40. Top electrode assembly 46 has a planar structure and includes a rigid frame 44 and top electrode 12, which is supported resiliently by four spring bars 48, 50, 52, 54 connected to frame 44. In some implementations, electrode assembly 46 is manufactured out of a single piece of electrically-conductive material (e.g., metal or doped silicon). A mass 56 may be attached on top of the top electrode 12 to control the resonance frequency of the device. The mass-spring structure of electrode assembly 46 is attached to the substrate 14 in such a way that the frame 44 rests on the spacer layer 42. In some embodiments, the two electrodes 12, 14 are connected electrically to a power extraction circuit that includes two external diodes serving as reset and the discharge elements. Electrode assembly 46, electrode 14, electret 16, and spacer layer 42 may be manufactured in batches using known photolithography techniques. In an example, the lateral dimensions of the resulting electromechanical power converter 10 are on the order of 10–15 millimeters (mm). The thickness of the electret layer is on the order of 1 micrometer ($\mu$m) and the gap at-rest ranges between 1 $\mu$m and 10 $\mu$m depending on the target output voltage. Additional details regarding how these design parameters affect device performance are explained in the attached Appendix.

Figure 7A:
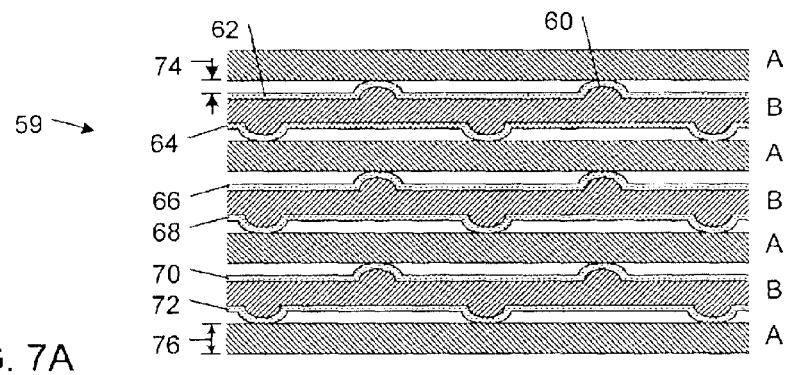
FIG. 7A is a diagrammatic cross-sectional view of an electromechanical power converter that includes multiple spacing features that are disposed between multiple electrode pairs.
Figure 7B:
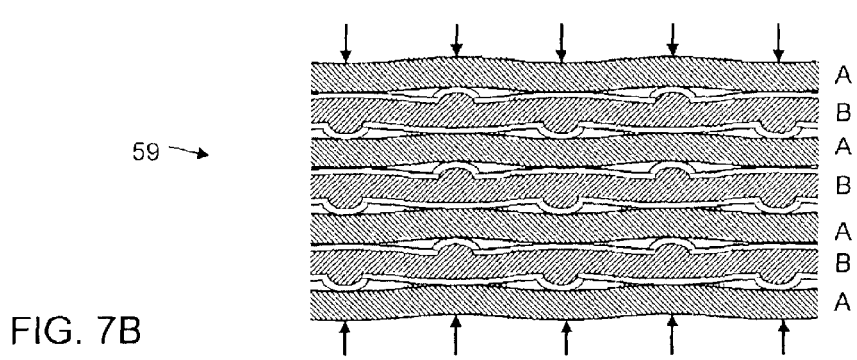
FIG. 7B is a diagrammatic cross-sectional view of the electromechanical power converter of FIG. 7A under compression.

FIGS. 7A and 7B show an electromechanical power converter embodiment that includes an electrode stack 59 composed of alternating layers of two types of sheets (A and B). All sheets of the same type are electrically connected together at the periphery. In the illustrated embodiment, sheets of type A are made of flat conductive material (e.g., aluminum foil) that is mechanically flexible. Sheets of type B are made of a similar material, but the surfaces of these sheets include spacing features 60 in the form of a texture of thin rectilinear strips (or ribs). These strips have the same spacing periodicity on both sides but are shifted by a half period. Either or both of the two types of sheets are coated on both sides by a thin film of electret material 62, 64, 66, 68, 70, 72. The electret coatings 62–72 are shown to have been deposited on type B sheets in FIGS. 7A and 7B. In other embodiments, electret coatings 62–72 may applied to type A sheets instead of or in addition to the electret coatings on type B sheets. The thickness 74 of spacing features 60 on the sheets of type B determines the at-rest spacing between adjacent electrodes. In some embodiments, the electrode layer structure is enclosed in a casing configured to keep the adjacent sheets in contact with each other and to prevent the electrode sheets from slipping laterally.

As shown in FIG. 7B, when pressure is applied on the top of the electrode layer stack 59, the layers undergo elastic deformation, which allows the stack to contract. The maximum contraction is reached when there is no empty space left between the layers at locations between the spacing features 60. This situation corresponds to the point of maximum capacitance between the sheets of groups A and B. Power conversion circuit 18 is configured to set the voltage between the two sets of electrodes to the reset voltage in this situation. When the pressure is removed, the stack returns to its original form and doing so converts some of the mechanical energy invested in the compression into electrical energy. In some embodiments, the sheets are fastened together at the surface features 60, allowing the structure to operate in tension as well as in compression.

In some implementations of the embodiment of FIGS. 7A and 7B, each conductive sheet is as thin as manufacturing constraints can support. In an example, the sheet thickness 76 is on the order of about 20 $\mu$m, and the electret layers 62–72 are on the order of about 1 $\mu$m thick. The height 74 of the spacing features 60 between adjacent electrode sheets are on the order of about 2–20 $\mu$m thick, depending on the target output voltage. Additional details regarding how these design parameters affect device performance are explained in the attached Appendix.

The above-described embodiments are not restricted to any particular mechanical energy source or any particular way of coupling the mechanical energy to the electromagnetic power converter. In some implementations, a source of vibrations (road surface, building structure) is exploited by fastening one side of the power converter (stator) to the source while attaching a mass on the other side (rotor), as depicted in FIG. 6B for instance. In operation, as the stator vibrates with respect to an inertial reference frame, the rotor also will move with respect to the stator and cause conversion of mechanical energy into electrical energy. The mechanical resonance of the electromechanical power converter may be tuned to the expected frequency of the mechanical energy source to enhance the amplitude of small vibrations. In some implementations, is acoustic energy is captured by a diaphragm mechanically coupled to the rotor in the manner of a microphone. In other implementations, turbulent water or air flow may be captured by thin fluttering structures, such as diaphragms or flags, coupled to the rotor and the power converter may be built on such structures. In some implementations, linear air flow or water flow may be converted to cyclic motion by a propeller and crank and the cyclic motion then used to compress an electromechanical power converter having the layered electrode structure of FIGS. 7A and 7B. In some implementations, body movements may be captured by embedding the layered electrode structure of FIGS. 7A and 7B into areas of cyclic compression such a shoe sole, heel or toe.

Other embodiments are within the scope of the claims.

For example, in the above-described embodiments, the inter-electrode capacitance is varied by changing the distance between electrodes. In other embodiments, the inter-electrode capacitance may be varied by changing the area of overlap between the electrodes (e.g., by moving one of both of the electrodes laterally with respect to each other). In some embodiments, both the inter-electrode spacing and the inter-electrode overlap area may be changed to vary the capacitance over the inter-electrode capacitance range.

In addition, although the exemplary rectifiers in the illustrated embodiments are shown as passive diodes, embodiments may include different rectifier implementations (e.g., rectifier circuits formed from a transistor and a differential amplifier). Although some of these rectifier implementations may consume power, the power saved by reducing the voltage drop across the rectifier may exceed the power consumed.

APPENDIX: DEVICE PHYSICS
1 INTRODUCTION

Figure 8:
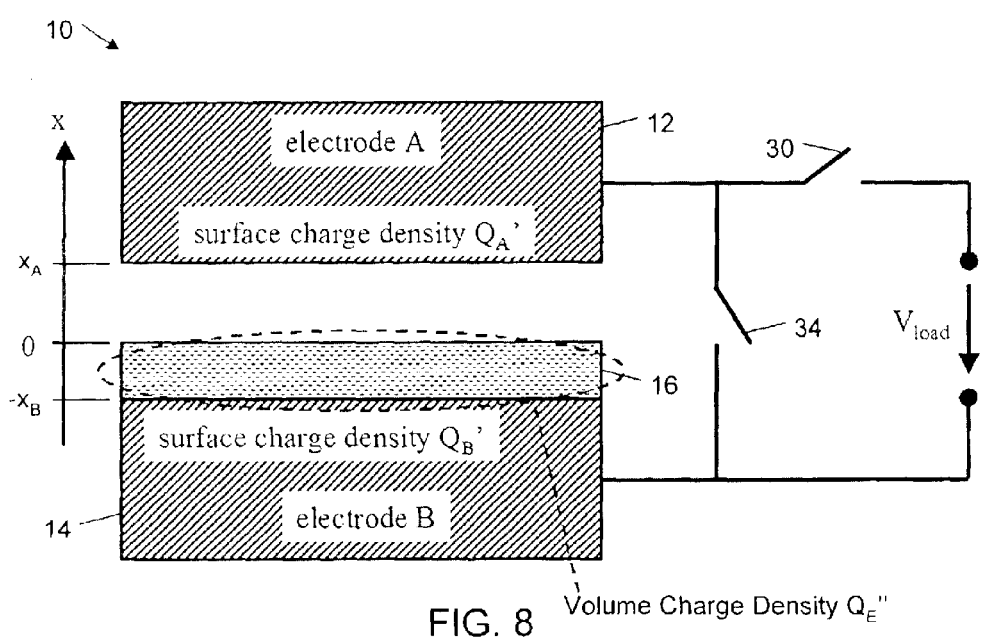
FIG. 8 is a block diagram of an implementation of the electromechanical power converter of FIG. 2 in which the reset element and the discharge element are implemented by switching elements.

Referring to FIG. 8, this Appendix provides a model of a capacitive electromechanical power conversion device 10 that includes two electrodes 12, 14 (hereinafter referred to as electrodes A and B, respectively), one of which (B) is coated by a thin film of electret material 16. The spacing between electrodes A, B changes cyclically under the action of a mechanical energy source (not shown). If the electrodes A, B are shorted during the reset phase (when the capacitance is large) and are then discharged through a load during the discharge phase (when the capacitance is small), then a net transfer of electrical energy takes place from the device 10 to the load. In this way, the mechanical energy used to pull the electrodes A, B apart against electrostatic attraction is transferred to the load in the form of an electric current.

Notations used in this Appendix are introduced in FIG. 8. The electret layer thickness is $x_B$ and the variable distance between electrode A and the electret surface is $x_A$. The trapped charge in the electret layer is assumed to have a uniform volume charge density $Q_E''$ in the volume of this layer. In the example presented in this Appendix, $Q_E''$, is assumed to be negative. Surface charge densities in the two electrodes are $Q_A'$ and $Q_B'$ respectively. Throughout this Appendix, the symbols of quantities representing surface charge densities will be followed by a single quote, whereas volume charge densities will be denoted by a double quote.

The lateral dimensions of the electrodes A, B are assumed to be much larger than the spacing between them at all times. The voltage $V_{load}$ across the external electrical load is assumed to remain essentially constant. This is a good approximation if the load includes a large decoupling capacitor integrating the discrete packets of charge delivered by the power converter, and if the direct current (DC) through the load is constant.

If a charge density $Q_A'$ is present at the surface of electrode A and a charge density $Q_B'$ is present at the surface of electrode B, the magnitude of electric field (E(x)) at all points along the x axis (FIG. 8) can be calculated by applying Gauss' law:

$$E(x) = \begin{cases} \dfrac{Q'_B + Q''_E \cdot (x + x_B)}{\varepsilon_0 \varepsilon_E} & \text{for } -x_B < x < 0 \text{ (in electret)} \\ -\dfrac{Q'_A}{\varepsilon_0} & \text{for } 0 < x < x_A \text{ (in air gap)} \end{cases} \quad (1)$$

where $\varepsilon_0$ is the permittivity of free space and $\varepsilon_E$ is the relative dielectric constant of the electret material 16.

Overall charge neutrality in the device commands that $$Q_A' + Q_B' + Q_E'' \cdot x_B = 0 \quad (2)$$

Therefore, the electric field in the electret 16 can be written $$E(x) = \dfrac{-Q'_A + Q''_E \cdot x}{\varepsilon_0 \varepsilon_E} \quad (3)$$

2 VOLTAGE

The potential V of electrode A with respect to electrode B as a function of the charge density $Q_A'$ on electrode A is given by $$V = \dfrac{1}{2} \dfrac{Q''_E}{\varepsilon_0 \varepsilon_E} x_B^2 + \dfrac{Q'_A}{\varepsilon_0} \cdot \left( x_A + \dfrac{x_B}{\varepsilon_E} \right) \quad (4)$$

This expression can be rewritten as $$V = V_0 + \dfrac{Q'_A}{C'_0} + \dfrac{Q'_A}{\varepsilon_0} \cdot x_A \quad (5)$$

where $V_0$ is referred to herein as the built-in voltage, which is defined by $$V_0 = \dfrac{1}{2} \dfrac{Q''_E}{\varepsilon_0 \varepsilon_E} x_B^2 \quad (6)$$

and $C_0'$ is the fixed part of the device capacitance contributed by the electret layer 16.

$$C'_0 = \dfrac{\varepsilon_0 \varepsilon_E}{x_B} \quad (7)$$

The built-in voltage $V_0$ arises from the presence of electret material between the electrodes A, B.

Some electret materials are better described by trapped surface charges rather than charges distributed throughout the volume as assumed above. Some other materials are better described by a polarization vector rather than a trapped charge density $Q_E''$. Such materials would also give rise to a built-in voltage $V_0$, although the definition of $V_0$ may differ from Equation (6).

3 STORED ENERGY

The amount of electrical energy $W_{el}'$ stored in the device can be calculated by integrating the square of the electric field $E(x)$—scaled by the local dielectric constant—over the volume enclosed by electrodes A and B. The result, expressed as a function of the stored charge density $Q_A'$, is $$W'_{el} = \dfrac{4}{3} C'_0 V_0^2 + 2 Q'_A V_0 + Q'^2_A \cdot \left( \dfrac{1}{C'_0} + \dfrac{x_A}{\varepsilon_0} \right) \quad (8)$$

The same result can also be written as a function of the voltage V across the device instead of the stored charge density $Q_A'$:

$$W'_{el} = \dfrac{C'_0}{3} \dfrac{1 + 4 \dfrac{C'_0 x_A}{\varepsilon_0}}{1 + \dfrac{C'_0 x_A}{\varepsilon_0}} V_0^2 + \dfrac{C'_0}{1 + \dfrac{C'_0 x_A}{\varepsilon_0}} V^2 \quad (9)$$

4 OPERATING CYCLE

4.1 RESET

It is assumed that the electrodes A, B are shorted together by a reset switch in the position where the air gap $x_A$ is zero. In this case, the voltage V is zero. The charge density $Q_{AR}'$ during the reset phase can be found by solving Equation(5):

$$Q_{AR}' = -C_0' V_0 \quad (10)$$

The amount of stored electrical energy is $$W'_{el} = \dfrac{1}{3} C'_0 V_0^2 \quad (11)$$

4.2 EXPANSION

When the electrodes A, B are pulled apart, the charge density $Q_A'$ remains constant and equal to $Q_{AR}'$ while the capacitance decreases, which causes the voltage to increase. When the peak air gap $x_{Amax}$ is reached, just before closing the discharge switch, the corresponding maximum voltage ($V_{max}$) of electrode A with respect to electrode B is given by:

$$V_{max} = -\dfrac{x_{A\,max}}{\varepsilon_0} C'_0 V_0 \quad (12)$$

Note that the voltage $V_{max}$ is positive if the built-in voltage $V_0$ of the cell is negative, and conversely (see equation (6)). The amount of stored electrical energy at this point is $$W'_{el,max} = \dfrac{1}{3} C'_0 V_0^2 + \dfrac{x_{A\,max}}{\varepsilon_0} C'^2_0 V_0^2 \quad (13)$$

4.3 DISCHARGE

When the discharge switch is closed, charge flows from electrode A to electrode B (or vice versa) through the load until the voltage across the electrodes is equal to the voltage across the load. Under the condition that the initial device voltage $V_{max}$ exceeds the initial load voltage $V_{load}$, energy is transferred from the device to the load as a result of this process. The magnitude of the initial load voltage $V_{load}$ may be zero or non-zero depending on the implementation of the load. The charge density $Q_{AD}'$ remaining on electrode A after charge redistribution can be found by solving Equation (5) for $x_A = x_{Amax}$ and $V = V_{load}$.

$$Q'_{AD} = \dfrac{V_{load} - V_0}{\dfrac{1}{C'_0} + \dfrac{x_{A\,max}}{\varepsilon_0}} \quad (14)$$

The difference $\Delta Q_A'$ between the initial charge density $Q_{AR}'$ and final charge density $Q_{AD}'$ on electrode A is the amount of charge transferred to the load:

$$\Delta Q_A' = \frac{V_{max} - V_{load}}{\frac{1}{C_0'} + \frac{x_{A\,max}}{\varepsilon_0}} \quad (15)$$

The amount of energy transferred to the load is $$\Delta W_{el,load}' = V_{load} \cdot \Delta Q_A' \quad (16)$$

Some of the energy is dissipated in the discharge switch during charge flow:

$$\Delta W_{el,loss}' = \frac{1}{2} \frac{(V_{max} - V_{load})^2}{\frac{1}{C_0'} + \frac{x_A}{\varepsilon_0}} \quad (17)$$

4.4 CONTRACTION

When the electrodes are allowed to move toward each other, the charge density $Q_A'$ remains constant while the capacitance increases, which causes the voltage between the electrodes to decrease. When the air gap $x_A$ is back to zero, just before closing the reset switch, the voltage ($V_{min}$) of electrode A with respect to electrode B is given by:

$$V_{min} = \frac{V_0}{1 + \frac{\varepsilon_0}{x_{A\,max}C_0'}} + \frac{V_{load}}{1 + \frac{x_{A\,max}C_0'}{\varepsilon_0}} \quad (18)$$

It can be verified that $V_{min}$ is zero if $V_{load}=V_{max}$. In this case, there is no energy exchange during the discharge phase, therefore the voltage returns exactly to its initial value of zero. If energy was actually delivered to the load, then $V_{min}$ differs from zero and has a sign opposite to $V_{max}$, hence the same sign as $V_0$.

The residual electrical energy can be calculated by substituting $V_{min}$ for V in Equation (9). This energy is dissipated in the switch during the reset phase.

4.5 COMMENT

In some implementations, the device is reset to a non-zero voltage during the reset phase. For example, when the reset element has a threshold voltage (e.g., when the reset element is a diode), the device is reset to a non-zero voltage corresponding to the threshold voltage. The above-described analysis readily may be extended to describe these implementations. The reset voltage should be greater than $V_0$ (if $V_0$ is negative) for the device to deliver power to the load. If a slightly negative reset voltage is acceptable, then the residual energy available at the end of the contraction phase can in principle be discharged through a secondary load.

4.6 PRACTICAL EXAMPLE

The maximum power density P' delivered per unit area is given by:

$$P' = \frac{f}{16} \frac{Q_E''^2 \cdot x_B^2}{\varepsilon_0} \frac{x_{A\,max}^2}{x_{A\,max} + \frac{x_B}{\varepsilon_E}} \quad (19)$$

Assuming $Q_E'=-100\,\mu C/m^2$, f=100 Hz, $x_B=1\,\mu m$, $\varepsilon_\epsilon=1.9$ and a target output voltage of 5 V, and the peak electrode displacement $x_{Amax}=1.77\,\mu m$, P' is equal to 9.6 mW/m². These parameter values are realistic for a practical planar electromechanical power converter device operating at low voltages compatible with small electronic systems. If power density is measured per unit volume instead of unit surface, the output power of the electromechanical power converter device corresponds to 700 W/m³ in this example. An electromechanical power converter with a power density of 700 W/m³ and a volume equivalent to a regular AA battery (8.34×10⁻⁶·m³) would produce an output power of about 5.84 mW. The output power can be improved if trapped charge densities higher than the 100 $\mu C/m^2$ assumed in these calculations can be achieved. Another way to increase power density would be to increase the frequency at which mechanical energy is captured above the 100 Hz assumed in these calculations.

What is claimed is:

1. An electromechanical power converter for delivering electric power to a primary load, the electromechanical power converter comprising:

first and second electrodes forming a variable capacitor with a capacitance that varies over an operative capacitance range as a result of relative electrode movement in response to mechanical energy;

an electret disposed between the first and second electrodes; and a power extraction circuit coupled between the first and second electrodes and operable to conduct charge between the electrodes through the primary load during a discharge phase and to set the electrodes to an inter-electrode reset voltage during a reset phase.

2. The electromechanical power converter of claim 1, wherein the first and second electrodes have an inter-electrode spacing that varies over an operative spacing range in response to the mechanical energy.

3. The electromechanical power converter of claim 1, wherein the electret comprises at least one layer of electret material disposed over a respective surface of at least one of the first and second electrodes.

4. The electromechanical power converter of claim 1, wherein the power extraction circuit comprises a reset element coupled between the first and second electrodes and operable to set the first and second electrodes to an inter-electrode reset voltage during the reset phase.

5. The electromechanical power converter of claim 4, wherein the reset element comprises one or more of the following: a mechanical switch, a rectifier, and an electronic switch.

6. The electromechanical power converter of claim 4, wherein the reset element is connected in series with a secondary load and is operable to transfer electric power from the electrodes to the secondary load during the reset phase.

7. The electromechanical power converter of claim 6, wherein the secondary load comprises a voltage source.

8. The electromechanical power converter of claim 6, wherein the secondary load comprises a passive load.

9. The electromechanical power converter of claim 4, wherein the reset element is connected in series with the primary load and is operable to transfer electric power from the electrodes to the primary load during the reset phase.

10. The electromechanical power converter of claim 1, wherein the power extraction circuit comprises a discharge element operable to selectively connect at least one of the first and second electrodes to the primary load during the discharge phase.

11. The electromechanical power converter of claim 10, wherein the discharge element comprises one or more of the following: a mechanical switch, a rectifier, and an electronic switch.

12. The electromechanical power converter of claim 1, wherein the power extraction circuit comprises a discharge element operable to respectively connect first and second terminals of the primary load to the first and second electrodes during the discharge phase, and a reset element operable to respectively connect second and first terminals of the primary load to the first and second electrodes during the reset phase.

13. The electromechanical power converter of claim 12, wherein each of the reset element and the discharge element comprises one or more of the following: a mechanical switch, a rectifier, and an electronic switch.

14. The electromechanical power converter of claim 1, wherein the power extraction circuit comprises a full-wave rectifier operable to respectively connect first and second terminals of the primary load to the first and second electrodes during the discharge phase and to respectively connect second and first terminals of the primary load to the first and second electrodes during the reset phase.

15. The electromechanical power converter of claim 1, wherein the first and second electrodes are mechanically coupled by a compliant member.

16. The electromechanical power converter of claim 15, wherein the first electrode is part of an electrode assembly comprising multiple spring bars resiliently coupling the first electrode to a peripheral element coupled to the second electrode by electrically insulating spacer material.

17. The electromechanical power converter of claim 16, further comprising a mass attached to a surface of the first electrode.

18. The electromechanical power converter of claim 1, further comprising multiple spacing features disposed between the first and second electrodes at respective spaced-apart locations, wherein at least one of the first and second electrodes is operable to be flexed by the mechanical energy toward the other of the first and second electrodes at locations between spacing features.

19. The electromechanical power converter of claim 18, wherein the spacing features correspond to ribs extending along a surface of at least one of the first and second electrodes.

20. The electromechanical power converter of claim 19, wherein the first electrode comprises a substantially planar surface facing the second electrode and the second electrode comprises a ribbed surface facing the first electrode.

21. The electromechanical power converter of claim 20, wherein the electret corresponds to a layer of electret material coating at least one of the facing electrode surfaces.

22. The electromechanical power converter of claim 20, wherein the second electrode comprises a second ribbed surface facing away from the first electrode.

23. The electromechanical power converter of claim 22, wherein ribs of the first and second ribbed surfaces are characterized by a common inter-rib spacing, the ribs of the first ribbed surface being offset along the first ribbed surface by one-half of the common inter-rib spacing.

24. The electromechanical power converter of claim 22, further comprising at least one pair of electrodes, the electrodes of each pair being substantially identical to a respective corresponding one of the first and second electrodes, the at least one pair of electrodes forming with the first and second electrode pair a stack of electrode pairs operable to undergo elastic deformation in response to compression of the stack by the mechanical energy.

25. The electromechanical power converter of claim 24, wherein corresponding electrodes of each electrode pair are electrically coupled together.

* * * * *